United States Patent [19]

Arai et al.

[11] Patent Number: 5,280,150
[45] Date of Patent: Jan. 18, 1994

[54] HEAT GENERATING CONTAINER FOR MICROWAVE OVEN

[75] Inventors: Nobushige Arai, Nara; Taisuke Morino, Suita, both of Japan

[73] Assignee: Sharp Kabushiki Kaisha, Osaka, Japan

[21] Appl. No.: 322,718

[22] Filed: Mar. 13, 1989

[30] Foreign Application Priority Data

| Mar. 14, 1988 | [JP] | Japan | 63-61590 |
| Jun. 16, 1988 | [JP] | Japan | 63-79757 |
| Jun. 16, 1988 | [JP] | Japan | 63-149095 |

[51] Int. Cl.⁵ ............................................ H05B 6/64
[52] U.S. Cl. ................. 219/10.55 E; 219/10.55 F; 99/DIG. 14; 99/348; 366/98; 426/243
[58] Field of Search .......... 219/10.55E, 219, 10.55F; 99/DIG.14; 348, 451; 366/69, 78, 97, 142, 98; 426/241, 243, 107; 126/390

[56] References Cited

U.S. PATENT DOCUMENTS

| 3,539,751 | 11/1970 | Levinson | 219/10.55 E |
| 3,845,266 | 10/1974 | Derby | 219/10.55 E |
| 3,941,967 | 3/1976 | Sumi et al. | 219/10.55 E |
| 4,015,085 | 3/1977 | Woods | 219/10.55 E |
| 4,266,108 | 5/1981 | Anderson et al. | 219/10.55 E |
| 4,398,077 | 8/1983 | Freedman et al. | 219/10.55 E |
| 4,450,334 | 5/1984 | Bowen et al. | 219/10.55 E |
| 4,499,356 | 2/1985 | Hatagawa | 219/10.55 E |
| 4,538,509 | 9/1985 | Ojima et al. | 99/348 |
| 4,663,506 | 5/1987 | Bowen et al. | 219/10.55 E |
| 4,728,762 | 3/1988 | Roth et al. | 219/10.55 E |
| 4,751,357 | 6/1988 | Boulard | 219/10.55 F |
| 4,762,057 | 8/1988 | Hirota et al. | 99/348 |
| 4,776,265 | 10/1988 | Ojima | 99/348 |
| 4,836,683 | 6/1989 | Aoyama | 366/98 |
| 4,844,048 | 7/1989 | Aruga et al. | 126/21 R |
| 4,845,327 | 7/1989 | Iwabuchi et al. | 219/10.55 F |
| 5,019,680 | 5/1991 | Morino et al. | 219/10.55 E |

FOREIGN PATENT DOCUMENTS

| 0091779 | 10/1983 | European Pat. Off. |
| 0219077 | 4/1987 | European Pat. Off. |
| 0219406 | 4/1987 | European Pat. Off. |
| 0249993 | 12/1987 | European Pat. Off. |
| 2159027A | 11/1985 | United Kingdom |

OTHER PUBLICATIONS

Japanese Patent Laid Open Publication No. 58-52916.
Japanese Patent Laid Open Publication No. 58-52917.

*Primary Examiner*—Bruce A. Reynolds
*Assistant Examiner*—Tu Hoang

[57] ABSTRACT

A heat generating container for use in a microwave oven or the like, which includes a metallic main container, a metallic lid to be detachably applied onto the metallic main container, and microwave absorbing heat generating film layers formed on outer surfaces of the metallic main container and metallic lid.

14 Claims, 4 Drawing Sheets

HEAT GENERATING CONTAINER FOR MICROWAVE OVEN

BACKGROUND OF THE INVENTION

The present invention generally relates to a high frequency heating arrangement and more particularly, to a heat generating vessel or container for use in a microwave oven which is one example of high frequency heating apparatuses, so as to generate heat through projection of microwaves irradiated from a magnetron (i.e., a high frequency generating means) for heating an object to be cooked, and also for baking thereof.

A microwave oven is a cooking apparatus arranged to guide microwaves emitted from a magnetron into an oven interior or heating chamber for irradiation onto an object to be cooked so as to effect cooking by causing said object itself to generate heat.

However, there are some items to be cooked which are not suitable for direct heating by microwaves such as those requiring scorched portions or those to be subjected to cooking after expediting fermentation by raising the temperature thereof.

In order to deal with the cooking items as referred to above, there has been proposed a microwave oven further provided with a sheathed heater in the heating chamber so as to make it possible to subject the item to be cooked to heat treatment through utilization of heat irradiated from said sheathed heater besides the microwave radiation.

In the microwave oven of the above described type, however, since two kinds of heating means, i.e., the magnetron and the sheathed heater, must be provided as heat sources, not only cost increase is involved thereby, but the construction of the microwave oven is undesirably complicated, with a consequent increase in the size of the apparatus on the whole.

Therefore, in order to overcome the various problems as described above, there has been recently developed a heat generating member composed of a plate in a double layer construction formed by laminating a heat generating substance (e.g., silicon carbide, ferrite or the like) which generates heat through irradiation of microwaves and an inorganic heat insulating base material (e.g., glass, ceramic or the like). There has also been proposed a heat generating member made of a silicon carbide group ceramic molded plate.

The microwave oven employing the heat generating members of the above described type is capable of effecting both the dielectric heating and the heating by heat radiation, only through irradiation of microwaves and is referred to as a multi-function microwave oven.

Incidentally, due to the fact that a so-called "home bakery" or household bread baking unit has recently become a popular article, a microwave oven provided with a bread baking function has been studied and manufactured as an actual product commercially available.

Although a bread baking container or hopper (referred to as a hopper hereinafter) to be disposed in the oven interior or heating chamber of the microwave oven is generally arranged to be heated indirectly, this practice requires parts for subjecting heated air to convection for efficient conduction of heat to the hopper, and thus, not only cost increase is involved thereby, but power consumption is undesirably raised due to poor heating efficiency, even when the heat is conducted in an efficient manner.

On the other hand, as a direct heating practice, there has conventionally been proposed an arrangement in which a microwave absorbing heat generating material is applied over an outer surface of a hopper as disclosed in Japanese Patent Laid-open Publication Tokkaisho No. 58-52916, or another arrangement in which a microwave absorbing heat generating material is coated on a ceramic or glass container as disclosed in Japanese Patent Laid-open Publication Tokkaisho No. 58-52917.

However, the known arrangements as described above have such problems that uneven baking (or scorching) may take place or yeast for fermentation is undesirably killed if applied to the bread bakery, since microwaves are transmitted into the container.

Meanwhile, since some of the conventional multi-function microwave ovens effect both functions for the microwave heating and the heating by heat radiation only by irradiation of microwaves, with the heating by heat radiation not killing yeast as in the microwave heating, they are applied to a bread baking device widely employed recently as well as to composite cooking. Such known bread baking device includes a hopper for accommodating materials such as flour and the like, to be disposed on a bottom plate in the heating chamber of the microwave oven, with the outer face of the hopper being coated by a microwave absorbing heat generating material, a kneading device having a stirring blade and provided under the hopper, and a metallic open-close lid of a clip fixing type provided at the upper portion of the hopper for shielding microwaves, and an outer cover made of a heat-resistance glass or the like for enclosing the above arrangement therein.

The known bread baking device as described above, however, has such disadvantages that, since the microwave absorbing heat generating material is coated over the entire outer surface of the hopper and the upper portion of the hopper is shielded by the metallic open-/close lid, without provision of any turntable or stirrer fan, irradiation of the microwaves from the upper portion through the outer cover, onto the microwave absorbing heat generating material becomes uneven, and thus, there is a possibility that the heat generating material at portions subjected to much microwave irradiation is melted due to local overheating, while it is difficult to uniformly scorch the entire surface of the bread to be prepared. Moreover, owing to the fact that the heat generating material is directly coated onto the outer surface of the hopper, said material tends to be subjected to various damages, e.g., separation, cracking by sintering, etc., arising from handling, such as grasping of the hopper during taking out the bread, careless collision thereof with other utensils, washing of the hopper by brushes, etc. after use, thus presenting problems from the aspect of durability. Furthermore, since the open/close lid at the upper portion of the hopper is of the clip fixing type, there is such a possibility that the bread swelling at the finished stage is compressed by the open/close lid for bursting upon releasing of the clip.

SUMMARY OF THE INVENTION

Accordingly, an essential object of the present invention is to provide a heat generating container for a microwave oven or the like, which is capable of preventing uneven heating and transmission of microwaves, with a simple construction for reduction of cost.

In accomplishing the above object, according to one aspect of the present invention, there is provided a heat generating container for use in a microwave oven, which includes a metallic main container, a metallic lid to be detachably applied onto such metallic main container, and microwave absorbing heat generating film layers formed on outer surfaces of said metallic main container and metallic lid.

The microwave absorbing heat generating film layer referred to above is prepared by a paint including 10 to 60% of resin having heat-resistance over 150° C. (silicon, epoxy, urethane, polyester resin, etc.) and ferrite powder, and a sealing material, or by a plasma spray coating or flame coating of ferrite and SiC. The outer surface of the microwave absorbing heat generating film layer is further covered by a microwave transmitting and heat-resistant paint (e.g., paint containing methylphenylsilicone resin, and ethylene tetrafluoride resin, polyether sulfone resin, polyphenyl sulfone resin or the like).

By the above arrangement of the present invention, since the metallic main container and lid are directly heated by the self-heat generation based on microwaves and the microwave absorbing heat generating film layer, high heating efficiency is available, and owing to the simple construction as compared with the arrangement of indirect heating, cost reduction may be achieved. The main container and lid made of metallic material are superior in heat conduction, thus reducing uneven heating, while they advantageously prevent microwaves from penetration. Moreover, the microwave transmitting and heat-resistant coating protects the microwave absorbing heat generating film layer, while improving the appearance of the product.

Another object of the present invention is to provide an improved bread baking device for a microwave oven in which the microwave absorbing heat generating material is arranged not to be locally overheated even by uneven irradiation of microwaves, and also not to be readily damaged during cooking or washing, thereby to present a bread baking device capable of effecting uniform and favorable bread baking, with a superior durability.

In accomplishing the above object, according to another aspect of the present invention, there is provided a bread baking device for use in a microwave oven, which includes a hopper placed on a bottom plate of a heating chamber for the microwave oven for accommodating therein materials for bread such as flour and the like, a stirring device for kneading the bread materials contained in the hopper, and an outer cover in a cup-shape detachably mounted on the bottom plate of the heating chamber so as to cover the hopper and the stirring device, and formed on its inner surface, with microwave absorbing heat-generating material layers which have a high dielectric loss to generate heat by absorbing microwaves.

By the above arrangement of the present invention, in the first place, after kneading the materials such as flour or the like charged in the hopper by the stirring device, the cup-shaped outer cover is mounted on the bottom plate in the heating chamber so as to cover the hopper and the stirring device thereby. Then, upon irradiation of microwaves onto the outer cover from above, the microwave absorbing heat generating material on the surface of the outer cover, generates heat through absorption of the microwaves, and this generated heat is conducted to the outer cover with a high heat conductivity for rapid diffusion, while the microwave absorbing heat generating material at a low temperature obtains heat from the outer cover for temperature rise. Accordingly, the above heat generating material rises in its temperature generally uniformly even when it is subjected to uneven microwave irradiation, without being fused or melted by local overheating, and thus, the hopper within the outer cover is generally uniformly heated from its entire peripheral portion, thereby to provide good bread having a uniformly scorched portion over its surface. Furthermore, since the heat generating material and the hopper are provided in a separated construction, there is no possibility that the heat generating member is damaged during insertion or withdrawal, or washing of the hopper.

A further object of the present invention is to provide a microwave absorbing heat generating member which is free from fusion or melting by local overheating even when subjected to uneven irradiation of microwaves.

In accomplishing the above object, according to a further aspect of the present invention, there is provided a microwave absorbing heat generating member, which includes a base member made of a metallic plate having a high heat conductivity and formed with a large number of through-holes, and a ceramic layer containing a microwave absorbing heat generating material with a high dielectric loss to generate heat by absorbing microwaves, and covering said base member to be integrally formed therewith.

By the above construction, when microwaves are irradiated onto the heat generating member constituted by the metallic base member having many through-holes and the ceramic layer containing the microwave absorbing heat generating material and covering said base member to be integral therewith, the microwaves are absorbed into the microwave absorbing heat generating material in the ceramics at the reverse face side of the base member via the many through-holes as well as into the ceramics at the front face side of said base member, and thus, the ceramic material generates heat comparatively uniformly at the front and reverse face sides thereof. The heat generated by the ceramic material is conducted to the base member with a high heat conductivity for rapid diffusion through said base member, while the ceramic material at a low temperature is raised in its temperature by the heat obtained from said base material. Accordingly, the microwave absorbing heat generating material having the construction as described above is raised in temperature generally uniformly even when subjected to uneven microwave irradiation, without any possibility of fusing or melting by the undesirable local overheating.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other objects and features of the present invention will become clear from the following description taken in conjunction with the preferred embodiments thereof with reference to the accompanying drawings which are given by way of illustration only, and thus are not limitative of the present invention, and in which.

DETAILED DESCRIPTION OF THE INVENTION

Before the description of the present invention proceeds, it is to be noted that like parts are designated by like reference numerals throughout the accompanying drawings.

Figure 3:
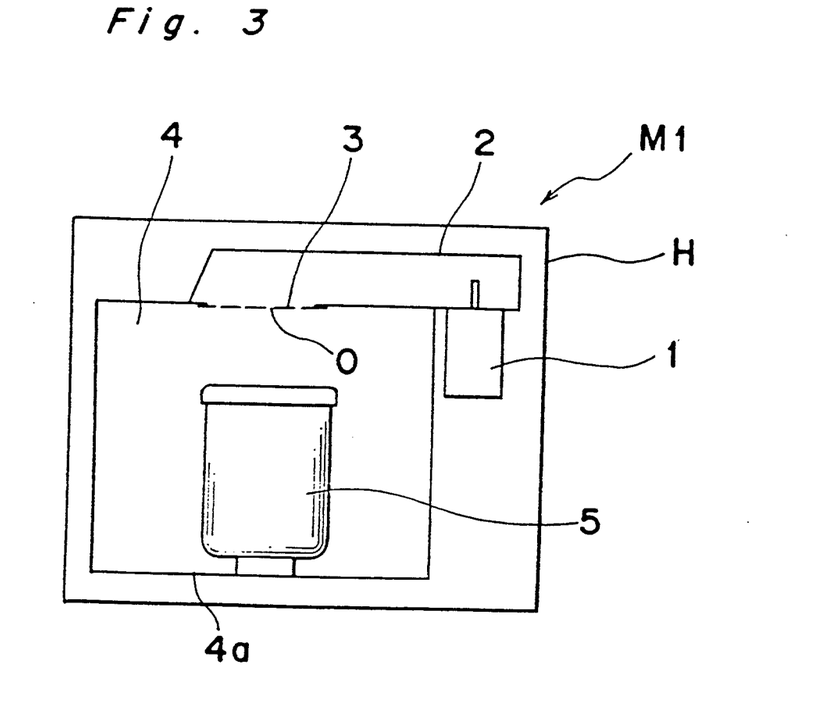
FIG. 3 is a schematic diagram showing a general construction of a microwave oven to which the bread baking container of FIG. 1 may be applied.
Figure 4:
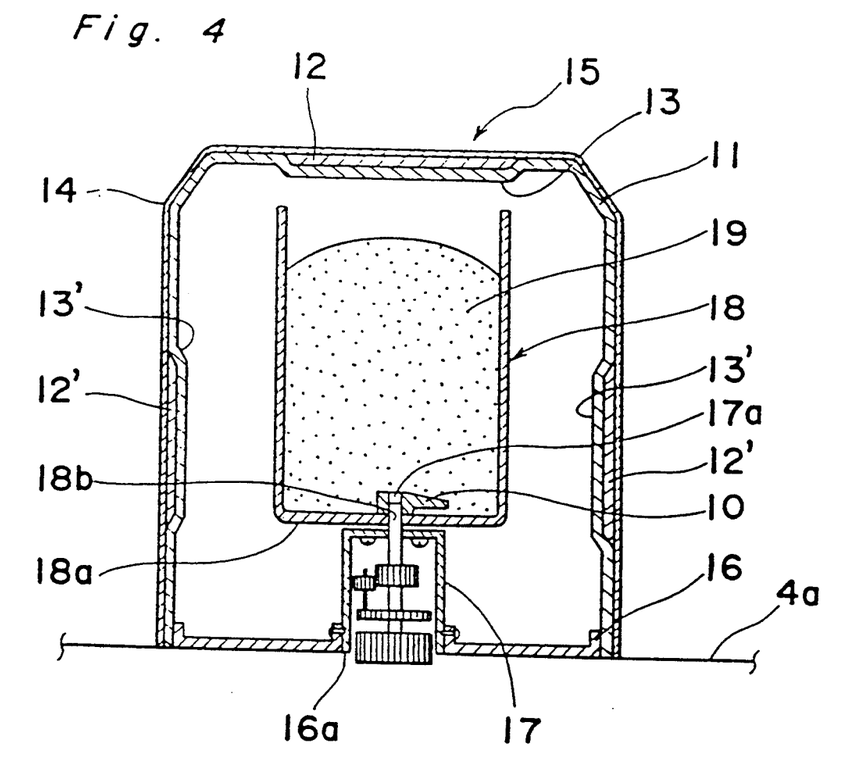
FIG. 4 is a view similar to FIG. 1, which particularly shows a general construction of a bread baking container according to a second embodiment of the present invention.

Referring now to the drawings, there is shown in FIG. 3 a schematic diagram illustrating a general construction of a single function microwave oven M1 to which a heat generating container in the form of a bread baking container 5 according to one preferred embodiment of the present invention may be applied. In FIG. 3, the microwave oven M1 includes a housing H in which a heating chamber 4 is defined, a magnetron 1 for emitting microwave energy, a waveguide 2 for leading microwave energy from the magnetron 1 into the heating chamber 4 through a waveguide cover 3 covering a feed opening O formed on a top wall of the heating chamber 4, and the bread baking container 5 directly related to the present invention and mounted on a bottom plate 4a within the heating chamber 4, with a kneading impeller m for the bread baking being rotatably provided at the bottom of the container 5 so as to be driven by a driving means D (FIG. 1).

Figure 1:
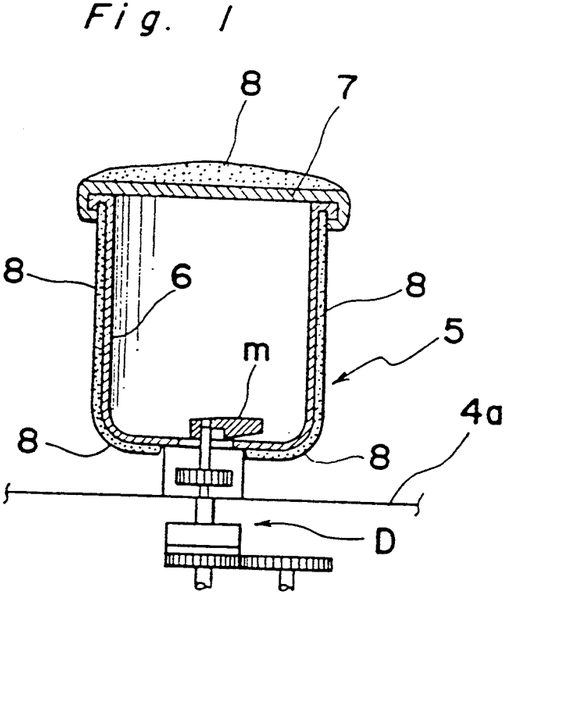
FIG. 1 is a schematic side sectional view showing a general construction of a bread baking container according to a first embodiment of the present invention.

As shown in FIG. 1, the bread baking container 5 generally includes a main container 6 and a lid 7 to be applied onto the main container 6, and both the main container 6 and the lid 7 are made of a metallic material which may shield microwaves, with a good conduction of heat, e.g., aluminum, aluminum alloy, stainless steel or the like. Over outer surfaces of the main container 6 and the lid 7, hard film layers 8, each of 100 to 300 microns in thickness, are formed by coating a microwave absorbing heat generating paint [e.g., a heat-resistant resin paint solution of silicone, epoxy or polyester group containing 40 to 90% (weight ratio) of iron oxide group ferrite powder (particle sizes in 1 to 10 μm) which efficiently absorbs microwaves].

Figure 2:
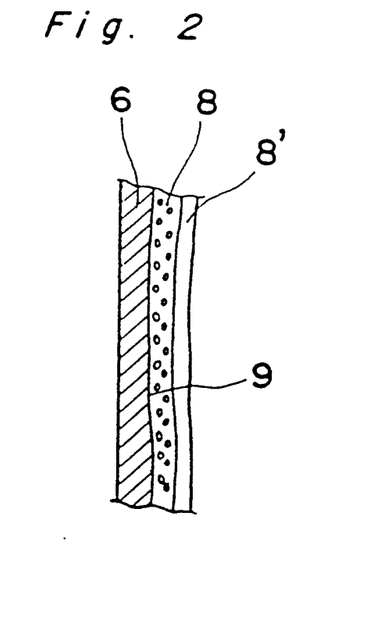
FIG. 2 is a fragmentary cross section showing on an enlarged scale, the structure of the wall for the bread baking container of FIG. 1.

With respect to the treatment of the ground of the container 5 for the coating, since the surface as it is obtained when a raw metallic plate is subjected to drawing or a raw material is molded by die casting, is inferior in the close adhesion of the painted coating, such surface is subjected to a primer treatment by a thin layer of a heat-resistant paint in several microns to several tens of microns after roughening the surface through sandblasting, or finished by a plasma spray coating of alumina, titania, or the like to be in such an undulated state as will reveal the ground. The resin paint containing ferrite is coated over the surface thus treated, thereby forming the hard film layer 8 as shown in FIG. 2.

In a single function microwave oven based only on the microwave irradiation (without any heater), and not arranged to effect uniform microwave irradiation by a turntable, stirrer fan or the like, it is preferable to form the main container 6 and lid 7 by a material having heat conductivity equal to or higher than aluminum. By way of example, when aluminum is used for the main container 6 and lid 7, in a series of baking processes including the charging of bread material into the container 5, mixing, kneading, fermentation by yeast, and baking, especially at a temperature range of 150° to 200° C., brown scorching is uniformly formed over the entire surface of the baked bread for delicious looking bread, whereas when stainless steel of SUS 304 is employed, the scorching after baking is too light to be tasteful, due to the fact that the stainless steel is inferior to aluminum in the heat conductivity and does not generate heat in itself through absorption of microwaves, since it is of a non-magnetic material of austenite group.

Meanwhile, when the main container 6 and the lid 7 are constituted by stainless steel of SUS 430, they are inferior in the heat conductivity as compared with the main container and lid of aluminum as described above. However, even a single material of SUS 430 stainless steel effects the microwave absorbing heat generation to a certain extent owing to possession of magnetic characteristics, and therefore, if the microwave absorbing ferrite paint is used for the finishing in the similar manner as above, heat generation of the ferrite coating synergistically acts in addition to the microwave absorbing heat generation of the raw material by covering up the poor heat conductivity, thus forming excessive scorching through temperature rise to a level higher than that in the case of the aluminum container. In addition, since no microwave stirring devices such as the turntable, stirrer fan, etc. are employed, irradiation of microwaves is not uniformly effected around the entire periphery of the bread baking container. Furthermore, due to the fact that the stainless steel SUS 430 is poor in heat conductivity similarly to SUS 340, the container prepared thereby is subjected to local heating, thus resulting in uneven scorching on the surface of the baked bread.

On the other hand, even in the single function microwave ovens, for a model provided with a turntable and/or a stirrer fan, stainless steel having the magnetic characteristics as in SUS 430 may be employed, since it is capable of effecting scorching formation by the uniform heating even if the heat conductivity is not higher than that of aluminum. However, with respect to stainless steel SUS 304 and plated steel plate such as aluminum plated steel plate, etc., it is difficult to deal with the situation by the ferrite paint. Accordingly, it becomes necessary to adopt a polymerization design by a cast item having a microwave absorbing heat generating power or ceramic SiC molded item and a heat insulating construction for preventing dissipation of heat out of the container.

The inner surfaces of the main container 6 and the lid 7 are subjected to a parting treatment of a fluorine coating by the ethylene tetrafluoride resin which is a known non-adhesive coating film or coating by silicon resin, PPS, and PES, etc. It is needless to say that an electromagnetic wave sealing treatment is required at the junction between the lid 7 and the main container 6 in order to prevent generation of sparking by the microwaves, and to protect the yeast from being killed by the microwave transmitted into the interior of the container 6 (for this purpose, conventional sealing technique may be adopted).

Since the coating film layer 8 containing 40 to 90% of ferrite is brittle and it is possible that such coating film layer 8 is detached due to formation of cracks by powder-like separation on the surface or deformation, the main container 6 and the lid 7 should be of molded items (press work, die-cast or casting) having a thickness not to be deformed by external forces, e.g., in the range of about 1.5 to 5 mm. Moreover, for improving close adhesion of the coating film layer 8, the metallic surfaces of the container 6 and the lid 7 are subjected to surface roughening by degreasing, acid or alkali treatment, sand-blasting, etc., or ground finish such as formation treatment by chromating, anodic oxidation by alunite, etc. Furthermore, heat-resistant primer treatment for a still better adhesion may be effected, for example, by coating a methylphenylsilicone resin paint containing aluminum powder in a thickness less than 10 microns or rough surface is formed by uniformly dispersing ceramic flame spraying of alumina over a surface subjected to sandblasting. Otherwise, onto the treated surface subjected to the above ground treatment, in addition to the primary treatment and ceramic flame spraying, a methylphenylsilicone resin paint containing Fe group ferrite particles effective for electromagnetic wave shielding of a microwave oven by about 50 to 90% (weight ratio) is applied generally over the entire surface in the range of 100 to 500 microns, with subsequent baking at a temperature of 280° C. for 30 minutes, thereby forming a strong film bonded by silicone resin.

In addition, depending on necessity, as a top coat for maintaining soiling-resistance, close adhesion and tough film layer, a layer of methylphenylsilicone resin, ethylene tetrafluoride resin, polyether sulfone resin, or grey color of polyphenyl sulfone resin paint (paint film which allows microwaves to be transmitted therethrough) may be applied for finishing in thickness of about 20 to 100 microns, whereby impacts on the exposed surfaces, contamination by water or food articles, or deterioration by entry of such water or food articles can be prevented for long periods.

On the other hand, in the coating method, it may also be so arranged to process ferrite or SiC as it is into a layer with thickness in the range of 100 to 500 microns by plasma flame spraying in an inert atmosphere without employment of resin for an organic binder. Furthermore, in the material in which the microwave absorbing heat generating material is mixed with glass frit or other ceramic material such as $Al_2O_3$, $TiO_3$ or the like not transmitting microwaves besides ferrite and SiC in the range of 40 to 90% in concentration, the material containing proper concentration of the microwave absorbing heat generating material may be used to form plasma flame spraying films on the outer surfaces of the main container and the lid. In such flame spraying film, since the microwave absorbing heat generating material is melted into the ground metal for close adhesion to each other, problems related to separation of films, impacts and durability may be remarkably improved.

By using the heat generating container according to the first embodiment as described so far, bread baking was carried out through employment of a single function microwave oven with a power source of AC 60 cycles and an output of 500 W by effecting ON-OFF electronic control of microwaves in a known manner.

As a result, it was found that a coating of 80% ferrite containing silicone resin film layer 8 in the thickness of 300 microns was the most suitable for the main container 6, and a coating of 60% ferrite containing silicone resin film layer 8 also in the thickness of 300 microns was the best for the lid 7, while a silicone resin paint in enamel color 8' (FIG. 2) containing ethylene tetrafluoride resin powder as applied in the thickness range of 20 to 100 microns was the best in durability for single units of the main container 6 and the lid 7. Meanwhile, as the metallic ground, the aluminum die-cast product subjected to plasma flame spraying 9 through porous dispersion of alumina after sand-blasting was favorable.

By the first embodiment of the present invention as described so far, a heat generating container for a microwave oven superior in the heating efficiency, with less heating irregularity can be provided at low cost, while said container may be used as a decorative component.

Figure 5:
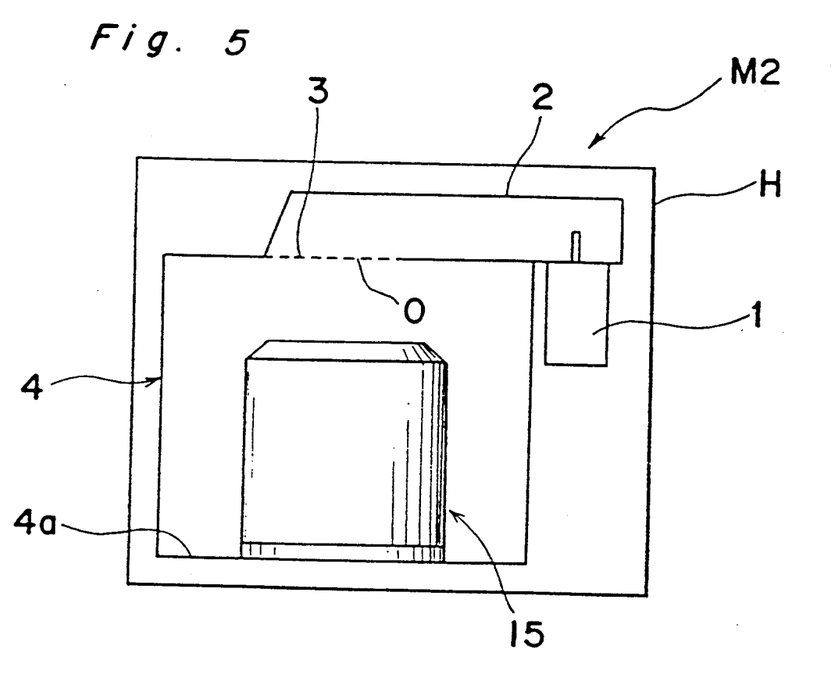
FIG. 5 is a schematic diagram showing a general construction of a microwave oven provided with the bread baking container of FIG. 4.

Referring further to FIG. 5, there is schematically shown a microwave oven M2 in which a bread baking device 15 according to a second embodiment of the present invention is used.

In the similar manner as in the microwave oven M1 in FIG. 3, the microwave oven M2 in FIG. 5 includes the housing H in which the heating chamber 4 is defined, the magnetron 1, the waveguide 2, the waveguide cover 3 provided at the microwave energy feed opening O, and the bread baking device 15 provided on the bottom plate 4a in the heating chamber 4 as illustrated.

The bread baking device 15 referred to above includes a circular pan 16 of heat-resistant plastics (glass fiber containing polyphenylene sulfide resin) fixed on the bottom plate 4a, a gear case 17 of a stirring device mounted on the bottom plate 4a to extend upwardly through a central opening 16a of said pan 16, a cylindrical hopper 18 of stainless steel for accommodating bread material 19 such as flour or the like, fixed on the upper face of said gear case 17, with an upper end of a driving shaft 17a which projects upwardly from said gear case 17 extending through a central opening 18b formed in a bottom portion 18a of said hopper 18, a stirring blade 10 fixed at the forward end of said driving shaft 17a, a cup-shaped outer cover 11 of copper detachably fitted over said pan 16 so as to cover said hopper 18 and gear case 17 from above, and ceramic layers 12 and 12' containing SiC (silicon carbide) as the microwave absorbing heat generating material and formed on the inner surface of said outer cover 11.

The ceramic layers 12 and 12' are provided respectively to fill up a recess 13 formed by drawing on a ceiling portion of the outer cover 11, and another recess 13' formed by drawing on the cylindrical portion of the outer cover 11 approximately from its central portion downwardly in a width equal to ⅓ to ½ of its total height to extend around the entire periphery of said cylindrical portion.

More specifically, SiN (silicon nitride) powder containing 40 to 70% of SiC is applied into the recess 13, while SiN powder containing 70 to 85% of SiC is applied into the recess 13' respectively, and these painted layers are held in a calcinating or sintering furnace at temperatures of 800° to 900° C. together with the outer cover 11, and thus, ceramic layers 12 and 12' of 3 to 5 mm in thickness, with a porosity of about 30% are formed. Otherwise, the layers 12 and 12' may be formed in such a manner that after flame spray coating of alumina into the recesses 13 and 13', the ceramic layers 12 and 12' having the above compositions and separately prepared by sintering are bonded thereto by a ceramic bonding agent, silicon sealer of a heat-resistant organic material, etc. Then, after forming the face of the outer cover 11 into a smooth surface without any stepped portions by sealing boundary portions between the ceramic layers 12 and 12' and the outer cover 11, etc. with a sealing material, a close adhering non-adhesive and high temperature resistant organic resin such as fluorine, silicon, polyethersulfone, or polyphenylene sulfide resin, etc. is subsequently applied onto the surface treated as above so as to form a top coat 14. The ceramic layers 12 and 12' as the microwave absorbing heat generating material thus formed, generate heat and rise in the temperature upon receipt of continuous irradiation of microwaves within the heating chamber 4, and heat the interior of the outer cover 11 up to temperatures in the range of 150° to 170° C. through convection, and similarly, heat the interior of the outer cover 11 up to a proper fermentation temperature of the bread material by yeast through reception of intermittent microwave radiation following the ON/OFF control based on a sensor and an electronic circuit (not shown).

Operations and functions of the bread baking device 15 as described so far will be explained hereinafter.

The outer cover 11 of the bread baking device 15 disposed in the heating chamber 4 of the microwave oven M2 in FIG. 5 is detached to place the bread material 19 such as flour or the like into the hopper 18, and then, a stirring blade 10 fixed at the upper end of the driving shaft 17a is rotated to knead the bread material. When the bread material has been sufficiently kneaded, the outer cover 11 is fitted onto the pan 16 to cover the hopper 18 from above to complete the setting. Subsequently, the microwaves generated by the magnetron 1 are irradiated onto the outer cover 11 from above. Then, the ceramic layers 12 and 12' as the microwave absorbing heat generating material on the surface of the outer cover 11 generate heat through absorption of the microwaves, and the heat thus produced is rapidly diffused as it is conducted through the outer cover 11 of copper having high heat conductivity, while the ceramic layer 12' subjected to less microwave irradiation as compared with the ceramic layer 12 receives heat from the outer cover 11 for temperature rise and heat generation. Accordingly, even when subjected to such non-uniform microwave irradiation, the ceramic layers 12 and 12' are raised in the temperature generally evenly, and uniformly heat the hopper 18 in the outer cover 11 from the entire periphery through convection without being fused or melted by local overheating. In other words, they heat the hopper 18 up to the optimum fermenting temperature during fermentation by yeast, and the temperatures in the range of 150° to 170° C. during bread baking period respectively.

In the above case, the yeast contained in the bread material 19 shielded from the microwaves by the outer cover 11 of copper and further, by the hopper 18 of stainless steel, effects the fermentation of flour without being damaged, and thus, the bread material is finished for baking by the above heating, with the surface of the baked bread being uniformly formed with the brown scorching. Moreover, close to the completion of the baking, the bread material 19 swells up so as to overflow the hopper 18, but even in such a case, the bread is allowed to swell in the natural state due to absence of any lid or the like which obstructs the swelling, and there is no possibility of bursting of bread during withdrawal of baked bread by removing the lid as in the conventional practice. Moreover, since the ceramic layers 12 and 12' as the microwave absorbing heat generating material are not coated onto the hopper 18 itself, they are not damaged by insertion or withdrawal of the hopper during baking of bread or by washing of the hopper after baking, thus providing remarkable durability.

It should be noted here that the present invention is not limited in its application to the foregoing embodiment alone, but may be modified, for example, in such a manner that, with the outer cover 11 of copper replaced by an outer cover of aluminum, the top coat 14 of high temperature resistant organic resin is replaced by a top coat of ceramic material, while the ceramic layer 12' for the outer cover 11 may be formed only at four directions instead of the entire periphery of the cylindrical portion as in the foregoing embodiment. Meanwhile, for the microwave absorbing heat generating material, besides the ceramic layers 12 and 12' in the foregoing embodiment, it may be possible to employ a painted film containing ferrite powder properly selected according to the magnetic characteristics at high concentration (e.g., 80%) (for example, a painted film prepared by methylphenylsilicone resin paint baked at 280° C. for 20 minutes so as to be in the thickness of 200 to 500 $\mu$m). In this case, the recesses 13 and 13' described as formed on the outer cover 11 are not necessarily required, and it may be so arranged to modify the film thickness at the ceiling portion to 100 to 200 $\mu$m or to change the film thickness on the cylindrical face to 300 to 500 $\mu$m, or further, to alter the film thickness at the ceiling portion to 300 to 500 $\mu$m, thereby to form the scorching to a larger extent over the upper surface of the bread.

As is seen from the foregoing description, the bread baking device for the microwave oven according to the second embodiment of the present invention is provided with the hopper placed on the bottom plate of the heating chamber for the electronic oven for accommodating therein materials for bread such as flour and the like, the stirring device for kneading the bread materials contained in the hopper, and the outer cover in the cup-shape detachably disposed on the bottom plate of the heating chamber so as to cover the hopper and the stirring device, and formed on its inner surface, with the microwave absorbing heat generating material layers which have a high dielectric loss to generate heat by absorbing the microwave. Therefore, even when subjected to uneven irradiation of microwaves, the device is capable of rising temperature of the heat generating material for heat generation generally uniformly by the outer cover, thus enabling the bread material within the hopper to be uniformly heated by the heat convection, etc. Moreover, by the construction in which the heat generating material is separated from the hopper, such heat generating material is free from damages during cooking or cleaning for use in favorable conditions for long periods.

Figure 7:
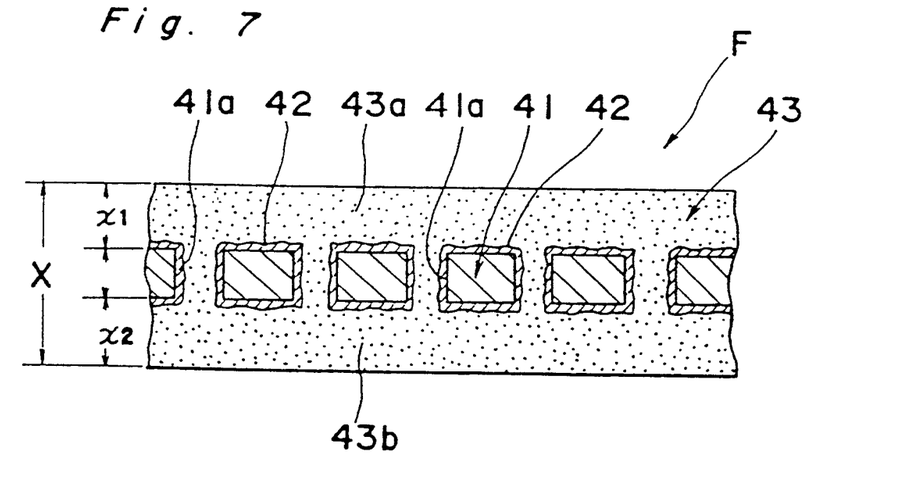
FIG. 7 is a fragmentary cross section of a microwave absorbing heat generating member which may be employed in the arrangement of FIG. 6.

Referring further to FIG. 7, there is shown a fragmentary cross section showing on an enlarged scale, construction of a microwave absorbing heat generating member F according to a third embodiment of the present invention. The microwave absorbing heat generating member F in FIG. 7 generally includes a base member 41 made of a copper plate or aluminum plate (in this embodiment, it is made of a copper plate) formed with many square through-holes 41a, a porous ceramic (alumina, titania, zirconia or the like) layer 42 formed over the entire surface of said base member 41 by plasma flame spray coating, and another ceramic material 43 made of SiN (silicon nitride) containing SiC (silicon carbide) which is the microwave absorbing heat generating material for generating heat through absorption of microwaves and integrally molded to cover said base member 41 as illustrated.

Figure 8:
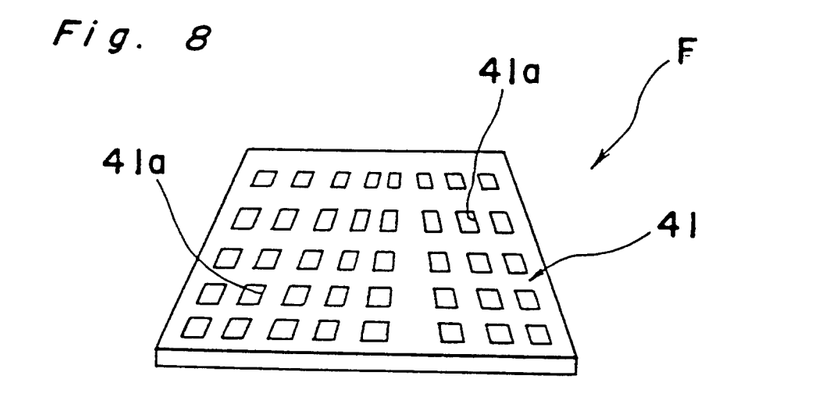
FIG. 8 is a perspective view showing a general structure of a base member employed in the heat generating member of FIG. 7.
Figure 9:
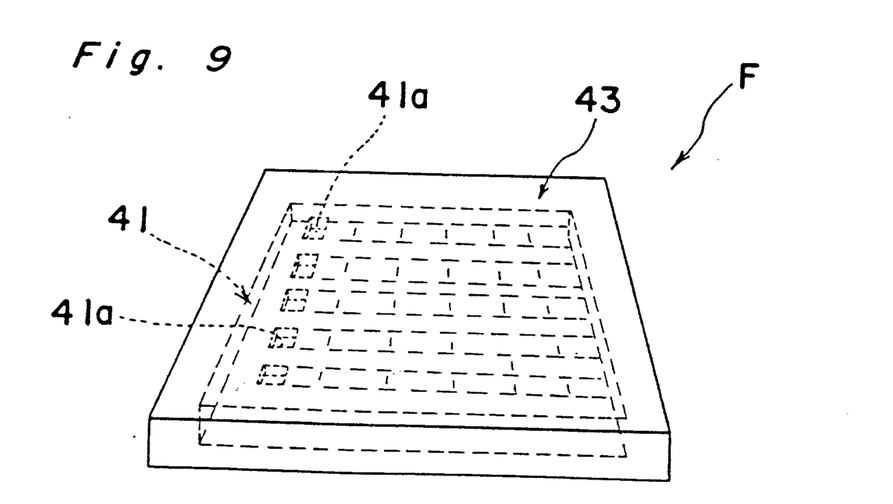
FIG. 9 is a perspective view of the heat generating member including the base member of FIG. 8 and ceramics as integrally formed therewith.

As shown in FIG. 8, the through-holes 41a are formed in the base member 41 in a lattice-like pattern through punching by press work, and each of the through-holes 41a is set to be larger than 3 mm$^2$ for permitting the microwaves to be effectively transmitted therethrough, and to be smaller than 10 mm$^2$ so as not to deteriorate the heat conductivity of the base member 41. The ceramic layer 42 formed over the surface of the base member 41 is intended to improve close adhesion of the ceramic material 40 to be formed thereover and to prevent deformation, crack formation and separation during use for long periods through absorption of thermal expansion difference. Meanwhile, the ceramic material 43 referred to above is prepared in such a manner that after homogenous mixing by a ball mill, of a mixture prepared by 60 to 90% of SiC particles, 10 to 30 % of SiN fine powder, and a small amount of bentonite, with addition thereto of a trace quantity of polyvinyl alcohol aqueous solution, the resulting mixture is dehydrated and granulated by a spray dryer. Then, the base member 41 is buried in the ceramic particles thus prepared, and charged into a metal mold for molding by press work into a plate-like shape, and subsequently, the molded member thus prepared is sintered by holding in a sintering furnace at temperatures of 800° to 900° C. for integral molding into the configuration as shown in FIG. 9. In this case, since the sintering temperatures are comparatively low at 800° to 900° C., the base member 41 made of, for example, copper or the like is not adversely affected. The microwave absorbing heat generating member F for the microwave oven, with outputs, for example of 500 to 1000 W, prepared in the above described manner has such dimensions that, in FIG. 7, the thickness Y of the base member 41 is set to be 30 to 40% of the total thickness X of said heat generating member for preventing local overheating and achieving proper heat generating temperatures, with the thicknesses x1 and x2 of the ceramic material 43 at the upper and reverse sides of the heat generating member F being set to be generally equal to each other.

Subsequently, functions of the microwave absorbing heat generating member F described so far with reference to FIGS. 7 to 9 will be explained hereinafter.

On the assumption that microwaves are irradiated onto the surface of the microwave absorbing heat generating member F, the microwaves are absorbed not only into the ceramic material 43a at the upper face side of the base member 41, but also into SiC as the microwave absorbing heat generating material in the ceramic material 43b at the reverse face side of the base member 1 through the many square through-holes 41a, and thus, the ceramic material 43 generates heat comparatively uniformly on the upper and reverse face sides at high heat generating efficiency. The heat generated by the ceramic material 43 is conducted to the base member 41 having a large thermal capacity, with high heat conductivity for rapid diffusion through said base member 41, while the ceramic portion at low temperatures is raised in its temperature by obtaining heat from the base member 41. In the above case, since the through-holes 41a are provided by the dimensions described earlier at a proper density, with the base member 41 and the plastic materials 43a and 43b at both sides having the thickness as stated earlier and the entire surface of the microwave absorbing heat generating member F is covered by the ceramic material 43 containing SiC, said heat generating member generates heat and is raised in its temperature even when subjected to uneven microwave irradiation, without any possibility of local overheating for being melted. Moreover, by the presence of the intermediate layer 42, durability is markedly improved. Accordingly, it becomes possible to uniformly heat the baking container by the microwave oven in which such microwave absorbing heat generating member F is properly provided within the heating chamber, and thus, said heat generating member F of the present invention may be said to have a particularly wide application.

A bread baking device 35 employing the microwave absorbing heat generating member as described so far may be applied to the microwave oven having the same construction as that described earlier with reference to FIG. 5. Within the microwave oven in FIG. 5, the microwaves generated by the magnetron 1 are led into the heating chamber 4 via the waveguide 2 through the feed opening O provided with the waveguide cover 3 so as to be irradiated onto the replaced bread baking device 35 disposed on the bottom plate 4a of the heating chamber 4.

Figure 6:
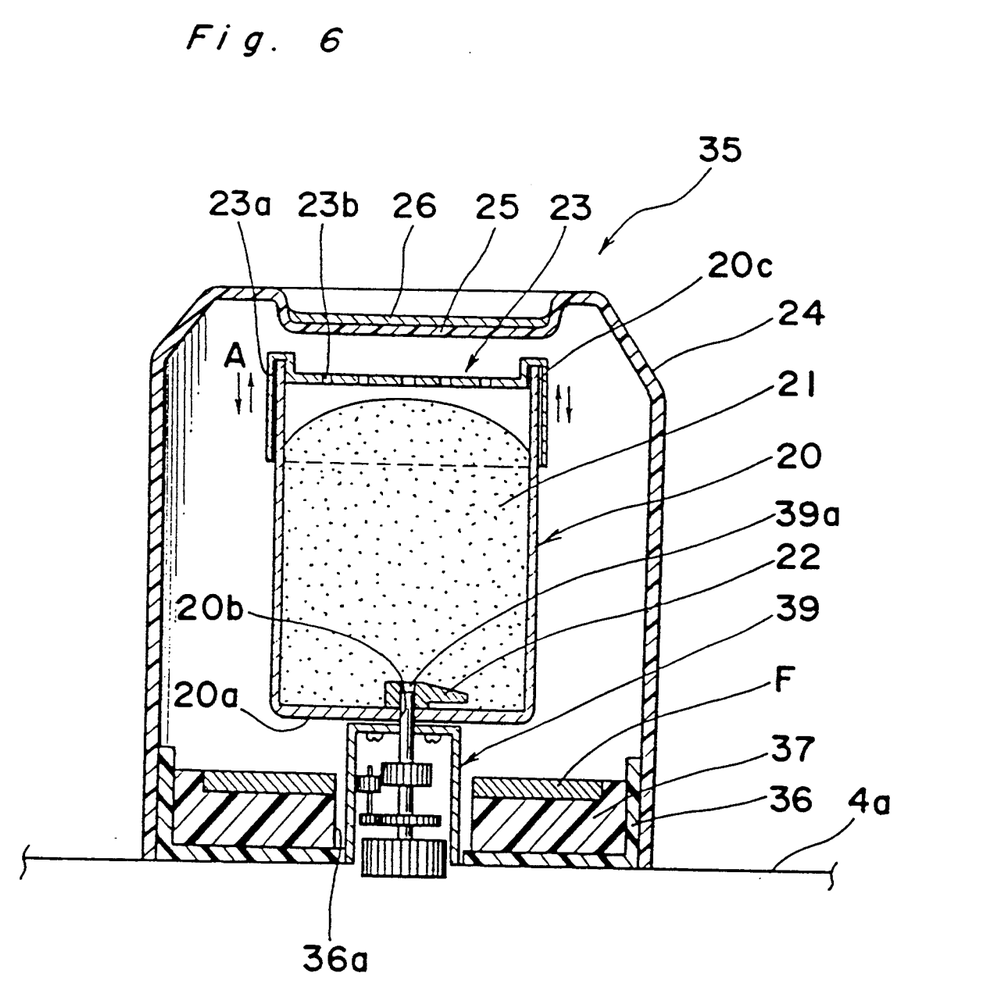
FIG. 6 is a view similar to FIG. 1, which particularly shows a general construction of a bread baking container according to a third embodiment of the present invention.

As shown in FIG. 6, the bread baking device 35 referred to above includes a circular pan 36 of a heat-resistant plastic material (glass fiber containing polyphenylene sulfide resin) in which a heat insulating material 37 made of an expandable fibrous ceramics and the microwave absorbing heat generating member F as described earlier with reference to FIG. 7 are laminated, and a gear case 39 of a driving unit erected on the bottom plate 4a of the heating chamber 4 so as to extend upwardly through a central through-hole 36a of said pan 36, a cylindrical hopper 20 of stainless steel for accommodating bread material 21 such as flour or the like, fixed on the upper face of said gear case 39, with an upper end of a driving shaft 39a which projects upwardly from said gear case 39 extending through a central opening 20b formed in a bottom portion 20a of said hopper 20, a stirring blade 22 fixed at the forward end of said driving shaft 39a, a cylindrical lid 23 of stainless steel having an annular groove 23a to be fitted onto an upper edge 20c of said hopper 20 and many small holes 23b formed therein and slidably fitted (in directions indicated by arrows A) over the upper portion of the hopper 20, and a cup-shaped outer cover 24 of a heat-resistant plastic material fitted over said pan 36 so as to cover said hopper 20 and gear case 39 from above. On the ceiling portion of the outer cover 24 confronting the cylindrical lid 23, a recess 25 is formed to provided scorching on the upper surface of the based bread, and over the surface of said recess 25, a silicone resin film 26 containing 60 to 80% of ferrite as the microwave absorbing heat generating material is applied in thickness in the range of 200 to 300 μm.

Operations and functions of the bread baking device 35 as described so far will be explained hereinafter.

The outer cover 24 of the bread baking device 35 disposed in the heating chamber 4 of the microwave oven in FIG. 5 is detached to charge the bread material such as flour or the like into the hopper 20, and then, the stirring blade 22 fixed at the upper end of the driving shaft 39a is rotated to knead the bread material. When the bread material has been sufficiently kneaded, the cylindrical lid 23 is applied onto the hopper 20, and the outer cover 24 is fitted onto the pan 36 to cover the hopper 20 from above to complete the setting. Subsequently, the microwaves generated by the magnetron 1 are irradiated onto the outer cover 24 from above. The microwaves thus projected are absorbed into the microwave absorbing heat generating member F on the pan 36 through the outer cover 24, and the heat generating member F is raised in its temperature to generate heat generally uniformly so as to heat the hopper 20 from its entire peripheral portion through convection. Meanwhile, the above microwaves are also absorbed by ferrite in the silicone resin film 26 on the surface at the ceiling portion of the outer cover 24, and the heat generated thereby heats the upper surface of the bread material 21 through the cylindrical lid 23.

In the above case, the yeast contained in the bread material and shielded from the microwaves by the hopper 20 of stainless steel and the cylindrical lid 23 effects the fermentation of flour without being damaged, and thus, the bread material is finished for baking by the above heating, with the surface of the baked bread being uniformly formed with the brown scorching. Moreover, close to the completion of the baking, the bread material swells up so as to overflow the hopper 20, but even in such a case, the bread is allowed to swell in the natural state owing to upward sliding movement of the cylindrical lid 23 without compressing the bread material, and there is no possibility of bursting of bread during withdrawal of baked bread by removing the cylindrical lid as in the conventional practice. It should be noted here that although the above microwave absorbing heat generating member F is located partly behind the hopper 20, whereby the irradiation of the microwaves tends to be non-uniform, owing to the construction as described with reference to FIG. 7, it generates heat generally uniformly, without any possibility of melting by the local overheating as in the conventional arrangement. In other words, the function of the heat generating member F as described above makes it possible to effect an ideal bread baking. Moreover, since the above microwave absorbing heat generating member F and the silicone resin film 26 containing ferrite are not directly coated on the hopper itself as in the known arrangements, they are not damaged during insertion and withdrawal of the hopper in the baking of bread or during washing of the hopper after baking, and thus, in cooperation with the function of the intermediate ceramic layer 42 as described earlier with reference to FIG. 7, a remarkable durability may be achieved.

It should also be noted here that, in the foregoing embodiment, although the pan 36 is described as made of polyphenylene sulfide resin, the material of the pan is not limited to the above, but may be replaced, for example, by a microwave transmitting material containing an inorganic filling agent or heat-resistant and impact resistant ceramic or glass material. Moreover, the heat-resistant ceramic material employed for the outer cover 24 may be replaced by heat-resistant glass or metallic material, and in the case where metallic material is used, it is necessary to employ a lath sheet in the form of wire mesh or a metallic sheet formed with many holes by punching operation for permitting microwaves to be transmitted therethrough. Furthermore, the base member 41 for the microwave absorbing heat generating member F in the embodiment of FIG. 7 may be formed by aluminum instead of copper.

As is clear from the foregoing description, the microwave absorbing heat generating member F according to the present invention as described with reference to FIGS. 7 to 9 is constituted by the base member made of a metallic plate having a high heat conductivity and formed with many through-holes, and the ceramics layer containing the microwave absorbing heat generating material with a high dielectric loss to generate heat by absorbing the microwaves, and covering the base member to be integrally formed therewith, and therefore, it is raised in its temperature for heat generation generally uniformly through rapid heat diffusion by the base member, even when subjected to non-uniform microwave irradiation, whereby the heat generating member of the present invention is capable of uniformly heating cooking containers and the like through simple and inexpensive construction for wide applications to replace conventional electric heaters.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A bread baking device for a microwave oven, comprising a hopper placed on a bottom plate of a heating chamber of the microwave oven for accommodating therein materials for making bread, a stirring device for kneading the bread materials contained in said hopper, and an outer cover in a cup-shape detachably mounted on the bottom plate of the heating chamber so as to cover said hopper and said stirring device, a ceiling of the outer cover being located over the hopper when the outer cover covers the hopper and stirring device, microwave absorbing heat generating material layers being provided on the outer cover, the microwave absorbing heat generating material layers having a high dielectric loss to generate heat by absorbing microwaves, and a recess being provided in a portion of the ceiling of the outer cover, the microwave absorbing heat generating material layers provided on the ceiling of the outer cover only being in the recess.

2. A microwave absorbing heat generating member, comprising a base member made of a metallic plate having a high heat conductivity and formed with a plurality of through-holes, and a ceramic layer containing a microwave absorbing heat generating material with a high dielectric loss to generate heat by absorbing microwaves, the ceramic layer covering said base member to be integrally formed thereby microwave absorbing heat generating member is without openings.

3. The bread baking device as claimed in claim 1, wherein the microwave absorbing heat generating material layers in the recess in the ceiling of the outer cover are embedded within the outer cover, a top coat being provided on an outside of the cover to enclose the microwave absorbing heat generating material.

4. The bread baking device as claimed in claim 3, wherein the top coat is a close adhering non-adhesive and high temperature resistant organic resin selected from the group comprising fluorine, silicon, polyethersulfone and polyphenylene sulfide resin.

5. The bread baking device as claimed in claim 1, wherein the outer cover further comprises a second microwave absorbing heat generating material layer positioned within a side wall of the outer cover, the second layer encircling the hopper when the outer cover is positioned over the hopper, the second layer having a length which is less than a length of the side wall of the outer cover whereby the second layer extends over only a portion of the side wall of the outer cover.

6. The bread baking device as claimed in claim 1, further comprising a movable lid positioned on the hopper, the lid having an outer edge which engages a side wall of the hopper and is slidable therealong as bread in the hopper swells and engages the lid.

7. The bread baking device as claimed in claim 6, wherein the lid has openings defined therein.

8. The bread baking device as claimed in claim 6, wherein the microwave absorbing heat generating material layers in the recess at the ceiling of the outer cover are positioned over the lid and a portion of the ceiling of the outer cover without the recess failing to be over the lid.

9. The microwave absorbing heat generating member as claimed in claim 2, wherein the ceramic layer is a first ceramic layer and the member further comprises a second ceramic layer, the second ceramic layer being formed over the base member and being covered by the first ceramic layer.

10. The microwave absorbing heat generating member as claimed in claim 9, wherein the second ceramic layer covers the entire surface of the base member.

11. The microwave absorbing heat generating member as claimed in claim 10, wherein the second ceramic layer is selected from the group comprising alumina, titania, and zirconia.

12. The microwave absorbing heat generating member as claimed in claim 11, wherein the base member is made of one of copper and aluminum and the first ceramic layer is made of silicon nitride containing silicon carbide.

13. The microwave absorbing heat generating member as claimed in claim 2, wherein the base member is made of one of copper and aluminum and the first ceramic layer is made of silicon nitride containing silicon carbide.

14. The microwave absorbing heat generating member as claimed in claim 2, wherein the through-holes are generally square and formed on the member is a lattice-like pattern and wherein the microwave absorbing heat generating member is generally flat.

* * * * *